United States Patent
Inoue et al.

(10) Patent No.: US 11,434,356 B2
(45) Date of Patent: Sep. 6, 2022

(54) PROPYLENE-BASED RESIN COMPOSITION

(71) Applicants: PRIME POLYMER CO., LTD., Tokyo (JP); NISSAN MOTOR CO., LTD., Yokohama (JP)

(72) Inventors: Shuichi Inoue, Sodegaura (JP); Satoru Kinouchi, Urayasu (JP); Kazuaki Tokumo, Kanagawa (JP); Takao Jouduka, Kanagawa (JP)

(73) Assignees: PRIME POLYMER CO., LTD., Tokyo (JP); NISSAN MOTOR CO., LTD., Yokohama (JP)

(*) Notice: Subject to any disclaimer, the term of this patent is extended or adjusted under 35 U.S.C. 154(b) by 113 days.

(21) Appl. No.: 17/049,803

(22) PCT Filed: Apr. 24, 2019

(86) PCT No.: PCT/JP2019/017324
§ 371 (c)(1),
(2) Date: Oct. 22, 2020

(87) PCT Pub. No.: WO2019/208601
PCT Pub. Date: Oct. 31, 2019

(65) Prior Publication Data
US 2021/0246289 A1    Aug. 12, 2021

(30) Foreign Application Priority Data

Apr. 24, 2018 (JP) .............. JP2018-083086

(51) Int. Cl.
*C08L 23/14* (2006.01)
*C08K 3/34* (2006.01)
*C08L 23/08* (2006.01)
*C08L 23/12* (2006.01)
*C08L 53/00* (2006.01)

(52) U.S. Cl.
CPC .............. *C08L 23/14* (2013.01); *C08K 3/34* (2013.01); *C08L 23/083* (2013.01); *C08L 23/0815* (2013.01); *C08L 23/12* (2013.01); *C08L 53/00* (2013.01); *C08L 2203/30* (2013.01); *C08L 2205/035* (2013.01)

(58) Field of Classification Search
CPC ...... C08L 23/0815; C08L 23/16; C08L 23/10; C08L 2205/03
See application file for complete search history.

(56) References Cited

U.S. PATENT DOCUMENTS

2010/0210780 A1* 8/2010 Sugimoto ............... C08L 23/10
524/505

FOREIGN PATENT DOCUMENTS

| JP | H08-302088 A | 11/1996 |
|---|---|---|
| JP | 2002-206034 A | 7/2002 |
| JP | 2012-107078 A | 6/2012 |
| JP | 2013-067818 A | 4/2013 |
| JP | 2014-221911 A | 11/2014 |
| JP | 2016-089059 A | 5/2016 |
| JP | 2016-194024 A | 11/2016 |
| JP | 2017-019975 A | 1/2017 |
| JP | 2017-082049 A | 5/2017 |

OTHER PUBLICATIONS

International Searching Authority, "International Search Report," issued in connection with International Patent Application No. PCT/JP2019/017324, dated Jul. 16, 2019.
International Searching Authority, "Written Opinion," issued in connection with International Patent Application No. PCT/JP2019/017324, dated Jul. 16, 2019.

* cited by examiner

Primary Examiner — Jeffrey C Mullis
(74) Attorney, Agent, or Firm — Foley & Lardner LLP

(57) ABSTRACT

Disclosed is a propylene-based resin composition comprising more than 15 parts by mass and 40 parts by mass or less of an ethylene/α-olefin copolymer (E1) and 4 to 20 parts by mass of an ethylene/α-olefin/diene copolymer (E2), and comprising also a propylene-based polymer (P1) having an amount of a n-decane-soluble part at 23° C. of 5 to 25% by mass, wherein the ethylene content of the n-decane-soluble part is more than 40% by mass and 60% by mass or less, a propylene homopolymer (P2) and an inorganic filler (F) [providing that the total amount of the components (P1), (P2), (E1), (E2) and (F) is taken as 100 parts by weight]. The propylene-based resin composition is capable of producing a molded article which is excellent in mechanical properties, unnoticeable flow marks, low gloss.

12 Claims, No Drawings

PROPYLENE-BASED RESIN COMPOSITION

CROSS-REFERENCE TO RELATED APPLICATIONS

The present application claims priority under 37 U.S.C. § 371 to International Patent Application No. PCT/JP2019/017324, filed Apr. 24, 2019, which claims priority to and the benefit of Japanese Patent Application No. 2018-083086, filed on Apr. 24, 2018.

TECHNICAL FIELD

The present invention relates to a propylene-based resin composition capable of producing a molded article used for various uses such as, for example, automobile exterior members, which is excellent in mechanical properties, unnoticeable flow marks and low gloss.

BACKGROUND ART

Molded articles obtained by injection molding of polypropylene resin compositions have been used in various fields such as automobile parts and parts of household electric appliances, from the viewpoint of its excellent mechanical properties and moldability, as well as their cost performance with relative advantageous in comparison with the other materials.

In the field of automobile parts, not only just polypropylene, but also the other polypropylene materials have been used, which include those having improved impact properties by addition of rubber components such as an ethylene-propylene copolymer (EPR), an ethylene-butene copolymer (EBR), an ethylene-octene copolymer (EOR), a styrene-butadiene copolymer (SBR) and a polystyrene-ethylene/butene-olystyrene triblock copolymer (SEBS) to polypropylene; those having improved rigidity by addition of inorganic fillers such as talc, mica and glass fibers; and blended polymers having well-balanced mechanical properties imparted by adding both a rubber component and an inorganic filler. Further, in recent years, research for improving appearances having flow marks (tiger stripes) and weld marks has progressed, and, thus, the proportion of polypropylene used in automobile parts has been increasing.

Patent Document 1 describes that it is possible to obtain a propylene-based resin composition and a molded article, which have a high physical property balance (high rigidity and high impact strength), high moldability (high flowability), excellent properties concerning flow mark appearance and low gloss appearance, by blending an elastomer having specific physical properties into a specific propylene-based resin.

Patent Document 2 discloses a polypropylene-based resin composition obtained by blending a modified polypropylene and a surface modifier into a resin composition comprising a polypropylene having a specific structure, either an ethylene/α-olefin copolymer or an ethylene/α-olefin/diene copolymer, another ethylene/α-olefin copolymer and an inorganic filler. Further, Patent Document 2 describes that such a resin composition can be used to make it possible to produce a molded article, which is suitable for injection molding as well as excellent in mechanical properties, low gloss and scratch-resistance and on which flow marks or weld marks are difficult to form.

However, the conventional propylene-based resin compositions still have room for improvement in appearances (suppression of flow mark), gloss (low gloss) and impact strength.

PRIOR ART DOCUMENT

Patent Document

[Patent Document 1] Japanese Unexamined Patent Application Publication (JP-A) No. 2016-194024; JP2016194024A

[Patent Document 2] JP-A No. 2014-221911; JP2014221911A

SUMMARY OF THE INVENTION

Problem to be Solved by the Invention

The object of the present invention is to provide a propylene-based resin composition capable of producing molded articles which are excellent in mechanical properties, unnoticeable flow marks and low gloss.

Means for Solving the Problem

The present inventors have intensively studied to solve the above-described problem and resultantly found that a propylene-based resin composition having a specific composition is excellent concerning mechanical properties, unnoticeable flow marks, and low gloss, and the present inventors have completed the present invention based thereon. The present invention is defined by the following matters:

[1] A propylene-based resin composition comprising 40 to 60 parts by mass of a propylene-based polymer (P1) having a melt flow rate (230° C., under a load of 2.16 kg) of more than 100 g/10 min and 130 g/10 min or less and having an amount of a n-decane-soluble part at 23° C. of 5 to 25% by mass, wherein the ethylene content in the n-decane-soluble part is more than 40% by mass and 60% by mass or less;

5 to 20 parts by mass of a propylene homopolymer (P2), more than 15 parts by mass and 40 parts by mass or less of an ethylene/α-olefin copolymer (E1), 4 to 20 parts by mass of an ethylene/α-olefin/diene copolymer (E2), and 0 part by mass or more and less than 36 parts by mass of an inorganic filler (F)

[providing that the total amount of the components (P1), (P2), (E1), (E2) and (F) is taken as 100 parts by mass].

[2] A propylene-based resin composition comprising 20 to 45 parts by mass of a propylene-based polymer (P1) having a melt flow rate (230° C., under a load of 2.16 kg) of more than 80 g/10 min and 100 g/10 min or less and having an amount of a n-decane-soluble part at 23° C. of 5 to 25% by mass, wherein the ethylene content of the n-decane-soluble part is more than 40% by mass and 60% by mass or less, 5 to 20 parts by mass of a propylene homopolymer (P2), more than 15 parts by mass and 40 parts by mass or less of an ethylene/α-olefin copolymer (E1), 4 to 20 parts by mass of an ethylene/α-olefin/diene copolymer (E2), and 0 part by mass or more and less than 56 parts by mass of an inorganic filler (F)
[providing that the total amount of the components (P1), (P2), (E1), (E2) and (F) is taken as 100 parts by mass].

[3] The propylene-based resin composition according to [1] or [2], wherein the melt flow rate (230° C., under a load of 2.16 kg) is 37 g/10 min or more and less than 50 g/10 min.

[4] A propylene-based resin composition comprising
20 to 60 parts by mass of a propylene-based polymer (P1) having an amount of a n-decane-soluble part at 23° C. of 5 to 25% by mass, wherein the ethylene content of the n-decane-soluble part is more than 40% by mass and 60% by mass or less,
0 to 20 parts by mass of a propylene homopolymer (P2),
more than 15 parts by mass and 40 parts by mass or less of an ethylene/α-olefin copolymer (E1),
4 to 20 parts by mass of an ethylene/α-olefin/diene copolymer (E2), and
0 part by mass or more and less than 61 parts by mass of an inorganic filler (F)
[providing that the total amount of the components (P1), (P2), (E1), (E2) and (F) is taken as 100 parts by mass],
wherein the propylene-based resin composition has a melt flow rate (230° C., under a load of 2.16 kg) of less than 37 g/10 min.

[5] A propylene-based resin composition comprising
20 to 60 parts by mass of a propylene-based polymer (P1) having an amount of a n-decane-soluble part at 23° C. of 5 to 25% by mass, wherein the ethylene content of the n-decane-soluble part is more than 40% by mass and 60% by mass or less,
5 to 20 parts by mass of a propylene homopolymer (P2),
more than 15 parts by mass and 40 parts by mass or less of an ethylene/α-olefin copolymer (E1),
4 to 20 parts by mass of an ethylene/α-olefin/diene copolymer (E2), and
0 part by mass or more and less than 56 parts by mass of an inorganic filler (F)
[providing that the total amount of the components (P1), (P2), (E1), (E2) and (F) is taken as 100 parts by mass],
wherein the propylene-based resin composition has a melt flow rate (230° C., under a load of 2.16 kg) of 50 g/10 min or more.

[6] The propylene-based resin composition according to [4] or [5], wherein 40 to 60 parts by mass of a propylene-based polymer having a melt flow rate (230° C., under a load of 2.16 kg) of more than 100 g/10 min and 130 g/10 min or less is contained as the propylene-based polymer (P1), and 0 part by mass or more and less than 36 parts by mass of the inorganic filler (F) is contained.

[7] The propylene-based resin composition according to [4] or [5], wherein 20 to 45 parts by mass of a propylene-based polymer having a melt flow rate (230° C., under a load of 2.16 kg) of more than 80 g/10 min and 100 g/10 min or less is contained as the propylene-based polymer (P1).

[8] The propylene-based resin composition according to [1], [2], [4] or [5], wherein the ethylene/α-olefin copolymer (E1) has a melt flow rate (230° C., under a load of 2.16 kg) of 1 to 5 g/10 min and the ethylene/α-olefin/diene copolymer (E2) has a melt flow rate (230° C., under a load of 2.16 kg) of more than 0.1 g/10 min and 0.5 g/10 min or less.

[9] The propylene-based resin composition according to [1], [2], [4] or [5], wherein the propylene-based polymer (P1) is a propylene/ethylene block copolymer.

[10] A molded article obtained by molding the propylene-based resin composition as described in [1], [2], [4] or [5].

[11] The molded article according to [10], which is an automobile exterior member.

[12] The molded article according to [11], which is an unpainted bumper material.

Advantageous Effect of the Invention

A molded article, which is excellent in mechanical properties, unnoticeable flow marks, low gloss, can be produced by the propylene-based resin composition according to the present invention. Such a molded article is suitable for various uses such as automobile exterior parts.

MODES FOR CARRYING OUT THE INVENTION

According to the present invention, it is important, in particular, that the amount of the ethylene/α-olefin copolymer (E1) in the composition is more than 15 parts by mass and 40 parts by mass or less, and the amount of the ethylene-α-olefin/diene copolymer (E2) therein is 4 to 20 parts by mass, from the standpoint of mechanical properties (particularly, impact resistance), flow marks and low gloss. Considering the overall balance of various physical properties, the preferable amounts of the other components vary depending on the level, i.e., a low or high level, of the melt flow rate of the propylene-based polymer (P1) or the level of the melt flow rate of the whole composition. Accordingly, the present invention comprises the following four inventions (divided into the first invention to the fourth invention), which have the common amount concerning the ethylene/α-olefin copolymer (E1) and the common amount concerning the ethylene/α-olefin/diene copolymer (E2), while the amounts of the other components are different, each other.

The first invention relates to a propylene-based resin composition comprising
40 to 60 parts by mass of a propylene-based polymer (P1) having a melt flow rate (230° C., under a load of 2.16 kg) of more than 100 g/10 min and 130 g/10 min or less and having an amount of a n-decane-soluble part at 23° C. of 5 to 25% by mass, wherein the ethylene content of the n-decane-soluble part is more than 40% by mass and 60% by mass or less,
5 to 20 parts by mass of a propylene homopolymer (P2),
more than 15 parts by mass and 40 parts by mass or less of an ethylene/α-olefin copolymer (E1),
4 to 20 parts by mass of an ethylene/α-olefin/diene copolymer (E2), and
0 part by mass or more and less than 36 parts by mass of an inorganic filler (F)
[providing that the total amount of the components (P1), (P2), (E1), (E2) and (F) is taken as 100 parts by mass].

The composition of the first invention described above corresponds to a case in which the melt flow rate of the propylene-based polymer (P1) is relatively high. In this case, the amount of the propylene-based polymer (P1) may be relatively large. Thus, impact resistance (particularly, surface impact strength at low temperatures) is improved.

The second invention relates to a propylene-based resin composition comprising
20 to 45 parts by mass of a propylene-based polymer (P1) having a melt flow rate (230° C., under a load of 2.16 kg) of more than 80 g/10 min and 100 g/10 min or less and having an amount of a n-decane-soluble part at 23° C. of 5 to 25% by mass, wherein the ethylene content of the n-decane-soluble part is more than 40% by mass and 60% by mass or less, 5 to 20 parts by mass of a propylene homopolymer (P2),
more than 15 parts by mass and 40 parts by mass or less of an ethylene/α-olefin copolymer (E1),
4 to 20 parts by mass of an ethylene/α-olefin/diene copolymer (E2), and
0 part by mass or more and less than 56 parts by mass of an inorganic filler (F)
[providing that the total amount of the components (P1), (P2), (E1), (E2) and (F) is taken as 100 parts by mass].

The composition of the second invention described above corresponds to a case in which the melt flow rate of the propylene-based polymer (P1) is relatively low. In this case, the amount of the propylene-based polymer (P1) is set in a relatively small level. Thus, impact resistance (particularly, surface impact strength at low temperatures) is improved.

The third invention relates to a propylene-based resin composition comprising
20 to 60 parts by mass of a propylene-based polymer (P1) having an amount of a n-decane-soluble part at 23° C. of 5 to 25% by mass. wherein the ethylene content of the n-decane-soluble part is more than 40% by mass and 60% by mass or less,
0 to 20 parts by mass of a propylene homopolymer (P2),
more than 15 parts by mass and 40 parts by mass or less of an ethylene/α-olefin copolymer (E1),
4 to 20 parts by mass of an ethylene/α-olefin/diene copolymer (E2), and
0 part by mass or more and less than 61 parts by mass of an inorganic filler (F)
[providing that the total amount of the components (P1), (P2), (E1), (E2) and (F) is taken as 100 parts by mass],
wherein the propylene-based resin composition has a melt flow rate (230° C., under a load of 2.16 kg) of less than 37 g/10 min.

The composition of the third invention described above corresponds to a case in which the melt flow rate of the composition as a whole is relatively low. This case is advantageous since a high molecular weight component having relatively good physical properties can be used as each component. The amount of the propylene-based polymer (P1) may be large or small. Further, the amount of the propylene homopolymer (P2) may be small or zero.

The fourth invention relates to a propylene-based resin composition comprising
20 to 60 parts by mass of a propylene-based polymer (P1) having an amount of a n-decane-soluble part at 23° C. of 5 to 25% by mass, wherein the ethylene content of the n-decane-soluble part is more than 40% by mass and 60% by mass or less,
5 to 20 parts by mass of a propylene homopolymer (P2), more than 15 parts by mass and 40 parts by mass or less of an ethylene/α-olefin copolymer (E1),
4 to 20 parts by mass of an ethylene/α-olefin/diene copolymer (E2), and
0 part by mass or more and less than 56 parts by mass of an inorganic filler (F)
[providing that the total amount of the components (P1), (P2), (E1), (E2) and (F) is taken as 100 parts by mass],
wherein the propylene-based resin composition has a melt flow rate (230° C., under a load of 2.16 kg) of 50 g/10 min or more.

The composition of the fourth invention described above corresponds to a case in which the melt flow rate of the whole composition is relatively high. This case is advantageous since the composition can be applied to a large-sized molded article or a thin and complicated-shaped molded article where flowability is required.

The amount of the propylene-based polymer (P1) may be large or small.
<Propylene-Based Polymer (P1)>
The melt flow rate (230° C., under a load of 2.16 kg) of the propylene-based polymer (P1) used in the first invention is more than 100 g/10 min and 130 g/10 min or less, preferably more than 100 g/10 and 120 g/10 min or less.

The melt flow rate (230° C., under a load of 2.16 kg) of the propylene-based polymer (P1) used in the second invention is more than 80 g/10 min and 100 g/10 min or less, preferably 90 g/10 min or more and 100 g/10 min or less.

The melt flow rate (230° C., under a load of 2.16 kg) of the propylene-based polymer (P1) used in the third invention and the fourth invention is preferably 80 to 130 g/10 min, more preferably 90 to 120 g/10 min.

Each range of the melt flow rates of the propylene-based polymer (P1) described above denotes a range of the melt flow rate of the whole propylene-based polymer (P1), when a plurality of types of propylene-based polymers having mutually different melt flow rates are mixed and used as the propylene-based polymer (P1).

The amount of the n-decane-soluble part at 23° C. in the propylene-based polymer (P1) is 5 to 25% by mass, preferably 5 to 20% by mass, more preferably 6 to 15% by mass, particularly preferably 7 to 12% by mass, and the amount of the n-decane-insoluble part at 23° C. is 75 to 95% by mass, preferably 80 to 95% by mass, more preferably 85 to 94% by mass, and particularly preferably 88 to 93% by mass (the total amount of the n-decane-soluble part and the n-decane-insoluble part is 100% by mass). The n-decane-insoluble part is generally defined as a component which is insoluble in a n-decane solvent at room temperature (23° C.). The n-decane-soluble part is preferably a copolymerized part component composed of propylene and ethylene (ethylene-propylene copolymer component).

The propylene-based polymer (P1) is preferably a propylene-based block copolymer obtained from propylene and ethylene. The limiting viscosity [η] of the n-decane-soluble part of the propylene-based block copolymer is preferably 3 to 10 dl/g, more preferably 5 to 7 dl/g.

The ethylene content of the propylene-based polymer (P1) is more than 40% by mass and 60% by mass or less, preferably more than 40% by mass and 55% by mass or less, more preferably more than 40% by mass and 50% by mass or less.

The propylene-based polymer (P1) may be used singly or in combination of two or more thereof.

The propylene-based polymer (P1) can be produced by a publicly known method. For example, a propylene-based block copolymer is obtained by polymerizing propylene using an olefin polymerization catalyst containing a solid titanium catalyst component (I) and an organometallic compound catalyst component (II) described below, and, then, copolymerizing propylene and ethylene.

The solid titanium catalyst component (I) constituting the olefin polymerization catalyst contains, for example, titanium, magnesium, a halogen and, if necessary, an electron donor. Any of the publicly known components can be used without restriction as this solid titanium catalyst component (I). A magnesium compound and a titanium compound are used in many cases for the preparation of the solid titanium catalyst component (I).

The organometallic compound catalyst component (II) contains a metal element selected from Group 1, Group 2 and Group 13 of the periodic table. For example, a compound contains a Group 13 metal (organoaluminum compound), an alkylated complex of a Group 1 metal and aluminum, and an organometallic compound of a Group 2 metal can be used. Among them, organoaluminum compounds are preferable.

As the organometallic compound catalyst component (II), for example, organometallic compound catalyst components described in European Patent No. 585869 can be suitably used.

The propylene/ethylene block copolymer as a preferred embodiment of the propylene-based polymer (P1), can be produced by, for example, polymerizing propylene in the presence of the above-described olefin polymerization catalyst and then copolymerizing propylene and ethylene, or polymerizing propylene in the presence of a pre-polymerization catalyst obtained by pre-polymerization and then copolymerizing propylene and ethylene.

<Propylene Homopolymer (P2)>

The propylene homopolymer (P2) used in the present invention may be a polymer obtained by polymerizing substantially only propylene. For example, a homopolymer obtained by polymerizing propylene alone, or a crystalline polymer obtained by copolymerizing propylene with 6% by mole or less, preferably 3% by mole or less of another α-olefin, can be used. Among them, a homopolymer obtained by polymerizing only propylene is preferable.

The propylene homopolymer (P2) can be produced by polymerizing monomers mainly containing propylene by a publicly known method. For example, the propylene homopolymer (P2) is obtained by polymerizing monomers mainly containing propylene in the presence of an olefin polymerization catalyst containing a solid titanium catalyst component (I) and an organometallic compound catalyst component (II) described above, or a combination catalyst composed of titanium trichloride and an alkylaluminum compound, called as a Ziegler-Natta type catalyst. The polymerization reaction may be carried out continuously or batchwise.

The melt flow rate (230° C., under a load of 2.16 kg) of the propylene homopolymer (P2) is preferably 200 to 1000 g/10 min, more preferably 300 to 800 g/10 min, and particularly preferably 400 to 600 g/10 min.

The propylene homopolymer (P2) may be used singly or in combination of two or more thereof.

<Ethylene/α-Olefin Copolymer (E1)>

The ethylene/α-olefin copolymer (E1) used in the present invention is a rubber component, and is typically a random copolymer composed of ethylene and α-olefin. As the α-olefin forming the ethylene/α-olefin copolymer (E1), an α-olefin having 4 to 8 carbon atoms is preferable, and, 1-butene, 1-hexene and 1-octene are particularly preferable. The α-olefin may be used singly or in combination of two or more thereof.

As the ethylene/α-olefin copolymer (E1), particularly, an ethylene/1-butene random copolymer, an ethylene/1-octene random copolymer and an ethylene/1-hexene random copolymer are preferred. The ethylene/α-olefin copolymer (E1) may be used singly or in combination of two or more thereof.

The melt flow rate (230° C., under a load of 2.16 kg) of the ethylene/α-olefin copolymer (E1) is preferably 1 to 3 g/10 min, more preferably 1.5 to 2.5 g/10 min.

The density of the ethylene/α-olefin copolymer (E1) is preferably 850 to 875 kg/m$^3$, and more preferably 860 to 870 kg/m$^3$.

<Ethylene/α-Olefin/Diene Copolymer (E2)>

The ethylene/α-olefin/diene copolymer (E2) used in the present invention is a rubber component and is a copolymer composed of ethylene, α-olefin and diene. As the α-olefin forming the ethylene/α-olefin/diene copolymer (E2), an α-olefin having 3 to 10 carbon atoms is preferable, and, propylene, 1-butene, 1-hexene and 1-octene are particularly preferable. The α-olefin may be used singly or in combination of two or more thereof.

Specific examples of the diene forming the ethylene/α-olefin/diene copolymer (E2) include cyclic non-conjugated dienes such as 5-ethylidene-2-norbornene, 5-propylidene-2-norbornene, dicyclopentadiene, 5-vinyl-2-norbornene, 5-methylene-2-norbornene, 5-isopropylidene-2-norbornene and norbornadiene; and linear conjugated dienes such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene. Among them, 1,4-hexadiene, dicyclopentadiene and 5-ethylidene-2-norbornene are preferred. The diene may be used singly or in combination of two or more thereof.

As the ethylene/α-olefin/diene copolymer (E2), an ethylene/propylene/5-ethylidene-2-norbornene copolymer and an ethylene/propylene/1,4-hexadiene copolymer are particularly preferable. The ethylene/α-olefin/diene copolymer (E2) may be used singly or in combination of two or more.

In the ethylene/α-olefin/diene copolymer (E2), the molar ratio of ethylene/α-olefin is preferably 40/60 to 99.9/0.1, more preferably 50/50 to 90/10, particularly preferably 55/45 to 85/15, and most preferably 55/45 to 78/22. Further, in 100% by mass of the ethylene/α-olefin/diene copolymer (E2) (that is, in 100% by mass of the weight fraction of all the structural units), the weight fraction of the structural units derived from dienes is preferably 0.07 to 10% by mass, more preferably 0.1 to 8% by mass, and particularly preferably 0.5 to 5% by mass.

The melt flow rate (230° C., under a load of 2.16 kg) of the ethylene/α-olefin/diene copolymer (E2) is preferably more than 0.1 g/10 min and 0.5 g/10 min or less, more preferably more than 0.1 g/10 min and 0.4 g/10 min or less, and particularly preferably 0.15 to 0.3 g/10 min.

<Inorganic Filler (F)>

Specific examples of the inorganic filler (F) used in the present invention include talc, calcium carbonate, natural mica, synthetic mica, wollastonite and montmorillonite. Among them, talc is preferred. The inorganic filler (F) may be used singly or in combination of two or more.

The average particle diameter of the inorganic filler (F) is preferably 1 to 15 μm, and more preferably 3 to 10 μm. By using the inorganic filler (F) having such an average particle diameter, the mechanical properties of a molded article are improved. This average particle diameter is a value measured by a laser diffraction method. Specifically, the particle diameter is defined as an integrated value of 50% in the particle diameter distribution obtained by a particle diameter distribution analyzer such as a laser diffraction/scattering mode particle diameter distribution analyzer.

As the inorganic filler (F), inorganic fillers having various shapes such as granular, plate-like, rod-like, fibrous and whisker-like can be used. An inorganic filler (F) which is commercially available as a polymer filler can also be used. Further, inorganic fillers (F) in the form of chopped strands, compressed bulks, pellets (granulated) and granules, with improved handling convenience, in addition to general powder and roving forms, can also be used. Among them, powdery, compressed bulk-like or granular inorganic fillers (F) are preferable.

<Other Ingredients>

Further, if necessary, other additives such as a heat resistant stabilizer, an antistatic agent, a weather resistant stabilizer, a light resistant stabilizer, an anti-aging, an antioxidant, a fatty acid metal salt, a softener, a dispersant, a filler, a colorant, a lubricant and a pigment can be added to the propylene-based resin composition, within a range that does not impair the object of the present invention. The order of mixing the additives is arbitrary. They may be mixed at the same time, or a multi-stage mixing method in which some components are mixed and then other components are mixed may be used.

<Propylene-Based Resin Composition>

In the first invention, the propylene-based resin composition comprises 40 to 60 parts by mass of the propylene-based polymer (P1), 5 to 20 parts by mass of the propylene homopolymer (P2), more than 15 parts by mass and 40 parts by mass or less of the ethylene/α-olefin copolymer (E1), 4 to 20 parts by mass of the ethylene/α-olefin/diene copolymer (E2), and 0 part by mass or more and less than 36 parts by mass of the inorganic filler (F) explained above [providing that the total amount of the components (P1), (P2), (E1), (E2) and (F) is taken as 100 parts by mass].

In the first invention, the amount of the propylene-based polymer (P1) is 40 to 60 parts by mass, preferably 40 to 55 mass parts, and more preferably 40 to 50 parts by weight. The amount of the propylene homopolymer (P2) is 5 to 20 parts by weight, preferably 8 to 15 parts by weight, and more preferably 10 to 14 parts by weight. The amount of the ethylene/α-olefin copolymer (E1) is more than 15 parts by mass and 40 parts by mass or less, preferably more than 15 parts by mass and 35 parts by mass or less, and more preferably more than 15 parts by mass and 30 parts by mass or less. The amount of the ethylene/α-olefin/diene copolymer (E2) is 4 to 20 parts by mass, preferably 4 to 18 parts by mass, and more preferably 5 to 15 parts by mass. The amount of the inorganic filler (F) is 0 part by mass or more and less than 36 parts by mass, preferably 5 to 30 parts by mass, and more preferably 10 to 30 parts by mass.

In the second invention, the propylene-based resin composition contains 20 to 45 parts by mass of the propylene-based polymer (P1), 5 to 20 parts by mass of the propylene homopolymer (P2), more than 15 parts by mass and 40 parts by mass or less of the ethylene/α-olefin copolymer (E1), 4 to 20 parts by mass of the ethylene/α-olefin/diene copolymer (E2) and 0 part by mass or more and less than 56 parts by mass of the inorganic filler (F) explained above [providing that the total amount of the components (P1), (P2), (E1), (E2) and (F) is taken as 100 parts by mass].

In the second invention, the amount of the propylene-based polymer (P1) is 20 to 45 parts by mass, preferably 25 to 45 parts by weight, and more preferably 30 to 45 parts by weight. The amount of the propylene homopolymer (P2) is 5 to 20 parts by mass, preferably 8 to 15 parts by mass, and more preferably 10 to 14 parts by mass. The amount of the ethylene/α-olefin copolymer (E1) is more than 15 parts by mass and 40 parts by mass or less, preferably more than 15 parts by mass and 35 parts by mass or less, and more preferably more than 15 parts by mass and 30 parts by mass or less. The amount of the ethylene/α-olefin/diene copolymer (E2) is 4 to 20 parts by mass, preferably 4 to 18 parts by mass, and more preferably 5 to 15 parts by mass. The amount of the inorganic filler (F) is 0 part by mass or more and less than 56 parts by mass, preferably 5 to 50 parts by mass, and more preferably 10 to 40 parts by mass.

In the third invention, the propylene-based resin composition contains 20 to 60 parts by mass of the propylene-based polymer (P1), 0 to 20 parts by mass of the propylene homopolymer (P2), more than 15 parts by mass and 40 parts by mass or less of the ethylene/α-olefin copolymer (E1), 4 to 20 parts by mass of the ethylene/α-olefin/diene copolymer (E2) and 0 part by mass or more and less than 61 parts by mass of the inorganic filler (F) explained above [providing that the total amount of the components (P1), (P2), (E1), (E2) and (F) is taken as 100 parts by mass].

In the third invention, the amount of the propylene-based polymer (P1) is 20 to 60 parts by mass, preferably 25 to 60 parts by weight, and more preferably 30 to 60 parts by weight. The amount of the propylene homopolymer (P2) is 0 to 20 parts by mass, preferably 0 to 15 parts by mass, and more preferably 0 to 14 parts by mass. The amount of the ethylene/α-olefin copolymer (E1) is more than 15 parts by mass and 40 parts by mass or less, preferably more than 15 parts by weight and 35 parts by mass or less, and more preferably more than 15 parts by mass and 30 parts by mass or less. The amount of the ethylene/α-olefin/diene copolymer (E2) is 4 to 20 parts by mass, preferably 4 to 18 parts by mass, and more preferably 5 to 15 parts by mass. The amount of the inorganic filler (F) is 0 part by mass or more and less than 61 parts by mass, preferably 5 to 50 parts by mass, and more preferably 10 to 40 parts by mass.

In the fourth invention, the propylene-based resin composition contains 20 to 60 parts by mass of the propylene-based polymer (P1), 5 to 20 parts by mass of the propylene homopolymer (P2), more than 15 parts by mass and 40 parts by mass or less of the ethylene/α-olefin copolymer (E1), 4 to 20 parts by mass of the ethylene/α-olefin/diene copolymer (E2) and 0 part by mass or more and less than 56 parts by mass of the inorganic filler (F) explained above [providing that the total amount of the components (P1), (P2), (E1), (E2) and (F) is taken as 100 parts by mass].

In the fourth invention, the amount of the propylene-based polymer (P1) is 20 to 60 mass parts, preferably 25 to 55 parts by weight, and more preferably 30 to 50 parts by weight. The amount of the propylene homopolymer (P2) is 5 to 20 parts by mass, preferably 8 to 20 parts by mass, and more preferably 10 to 20 parts by mass. The amount of the ethylene/α-olefin copolymer (E1) is more than 15 parts by mass and 40 parts by mass or less, preferably more than 15 parts by mass and 35 parts by mass or less, and more preferably more than 15 parts by mass and 30 parts by mass or less. The amount of the ethylene/α-olefin/diene copolymer (E2) is 4 to 20 parts by mass, preferably 4 to 18 parts by mass, and more preferably 4 to 15 parts by mass. The amount of the inorganic filler (F) is 0 part by mass or more and less than 56 parts by mass, preferably 5 to 50 parts by mass, more preferably 10 to 40 parts by mass.

In the first invention and the second invention, the melt flow rate (230° C., under a load of 2.16 kg) of the propylene-based resin composition is not particularly limited, and is preferably 37 g/10 min or more and less than 50 g/10 min.

In the third invention, the melt flow rate (230° C., under a load of 2.16 kg) of the propylene-based resin composition is less than 37 g/10 min, and preferably 20 g/10 min or more and less than 37 g/10 min.

In the fourth invention, the melt flow rate (230° C., under a load of 2.16 kg) of the propylene-based resin composition is 50 g/10 min or more, and preferably 50 to 80 g/10 min.

Examples of the method of blending each of the components include a method of mixing or melt-kneading each of the components simultaneously or sequentially using a mixing device such as a Banbury mixer, a single-screw extruder, a twin-screw extruder or a high-speed twin-screw extruder.

<Molded Article>

The molded article according to the present invention is obtained by molding the propylene-based resin composition according to the present invention. As the molding method, publicly known processing methods such as injection molding can be used. The resulting molded article can be used as a product without providing a post step such as painting and skin formation since the molded article is not only excellent in mechanical properties but also excellent in low gloss, and since flow mark generation thereon is suppressed. Hence, the molded articles can be suitably used, for example, as the material for automobile exterior parts, particularly unpainted bumpers.

EXAMPLES

The present invention will be described more specifically referring to examples below, however, the present invention is not limited to them.

The components used in the examples and the comparative examples are as follows.

<Propylene-Based Polymer (P1)>

"P1-1": propylene/ethylene block copolymer [manufactured by Hanwha Total, trade name: BI997, MFR=95 g/10 min, amount of n-decane-soluble part=7.5% by mass, limiting viscosity [η] of n-decane-soluble part=6.7 dl/g, ethylene content of n-decane-soluble part=58% by mass (48% by mole)]

"P1-2": propylene/ethylene block copolymer [manufactured by SK Global Chemical Co., Ltd., trade name: BX3920, MFR=110 g/10 min, amount of n-decane-soluble part=7.9% by mass, limiting viscosity [η] of n-decane-soluble part=5.2 dl/g, ethylene content of n-decane-soluble part=54% by mass (44% by mole)]

<Propylene Homopolymer (P2)>

"P2-1": homopolypropylene [manufactured by Prime Polymer Co., Ltd., trade name: H50000, MFR=500 g/10 min]

<Ethylene/α-Olefin Copolymer (E1)>

"E1-1": ethylene/1-butene random copolymer [manufactured by Mitsui Chemicals, Inc., trade name: A0250S, MFR=0.5 g/10 min, density=860 kg/m$^3$].

"E1-2": ethylene/1-butene random copolymer [manufactured by Mitsui Chemicals, Inc., trade name: A1050S, MFR=2.2 g/10 min, density=862 kg/m$^3$].

"E1-3": ethylene/1-butene random copolymer [manufactured by Mitsui Chemicals, Inc., trade name: A4050S, MFR=6.7 g/10 min, density=864 kg/m$^3$].

"E1-4": ethylene/1-butene random copolymer [manufactured by LG Chemical Co., trade name: LC670, MFR=18.0 g/10 min, density=870 kg/m$^3$].

"E1-5": ethylene/1-butene random copolymer [manufactured by LG Chemical Co., trade name: LC565, MFR=19.4 g/10 min, density=865 kg/m$^3$].

"E1-6": ethylene/octene random copolymer [manufactured by Dow Chemical Co., trade name: XLT8677, MFR=0.9 g/10 min, density=870 kg/m$^3$].

<Ethylene/α-Olefin/Diene Copolymer (E2)>

"E2-1": ethylene/propylene/5-ethylidene-2-norbornene copolymer [manufactured by Mitsui Chemicals, Inc., product name: 3092PM, MFR=0.2 g/10 min)

<Inorganic Filler (F)>

"Talc": talc [manufactured by IMI Fabi, trade name: HTP1C, average particle diameter: 5.7 μm]

<Other>

"HDPE": high-density polyethylene [manufactured by Prime Polymer Co., Ltd., trade name: 3300F, MFR=2.0 g/10 min, density=950 kg/m$^3$]

The MFR, amount of n-decane-soluble part and limiting viscosity of each component described above are values obtained by measurement by the following methods.

[Melt Flow Rate (MFR)]

The melt flow rate was measured according to ISO 1133 under conditions of a load of 2.16 kg and a temperature of 230° C.

[Amount of n-Decane-Soluble Part]

About 5 g of a polymer sample (assuming the accurate polymer sample mass is "a") was charged in an Erlenmeyer flask together with 200 ml of n-decane and BHT (3,5-di-t-butyl-4-hydroxytoluene) in an amount of about 1% with respect to the sample amount, and the mixture was heated to 145° C. and stirred for 1 hour. After confirming that the polymer sample was completely dissolved, the resulted solution was allowed to cool for 1 hour. Thereafter, a polymer was deposited while stirring with a magnetic stirrer at room temperature (23° C.) for 1 hour. This deposited polymer was suction-filtered using a suction bottle and a funnel (325 mesh screen). Then, acetone was added to the separated filtrate to about 1 liter, and the mixture was stirred for 1 hour to deposit a n-decane-soluble part. At this time, if the content liquid did not become transparent, acetone was further added and stirring was continued. This deposited n-decane-soluble part was filtered using a suction bottle and a funnel (325 mesh screen), and collected. Then, the collected deposit was dried under reduced pressure for 1 hour under the conditions of 105° C. and 20 mmHg or less. The amount of the n-decane-soluble part was calculated by the following formula, where the collected amount of the n-decane-soluble part after drying was designated as "b".

Amount of *n*-decane-soluble part (%)=(*b/a*)×100 a: mass (g) of polymer sample
b: collected amount (g) of n-decane-soluble part

[Limiting Viscosity [η]]

About 20 mg of the sample was dissolved in 15 ml of decalin, and the specific viscosity ηsp was measured in an oil bath at 135° C. After further adding 5 ml of decalin and diluting, the specific viscosity ηsp was measured in the same manner. This dilution operation was repeated further twice, and the value of ηsp/C when the concentration (C) was extrapolated to 0 was defined as the limiting viscosity, and the limiting viscosity [η] was calculated by the following formula.

[η]=lim(η*sp/C*)      (C→0)

Examples A1 to A3 and Comparative Examples A1 to A7

Each of the resin compositions composed of components in blending amounts (parts by mass) shown in Tables 1 and 2 was prepared, respectively, and the MFR of each of the resin compositions was measured by the method described above. For evaluation, the following method was used. The results are shown in Tables 1 and 2.

[Flexural Modulus]

The flexural modulus (MPa) was measured according to ISO 178 under the conditions of a temperature of 23° C., a span distance of 64 mm and a bending speed of 2 mm/min.

[IZOD Impact Strength]

The IZOD impact strength (kJ/m$^2$) was measured according to ISO 180 under the conditions of a temperature of −20° C. with a notch, and a hammer capacity of 1 J.

[−30° C. Puncture Impact Strength]

The puncture impact strength (J) was measured according to ISO 6630-2 under the conditions of a striker diameter of 20 mm, a support base inner diameter of 40 mm, an impact velocity of 4.4 m/s and a temperature of −30° C.

[Flow Mark]

A flow mark generation point was visually marked on a molded square plate (length 350 mm, width 100 mm, thickness 2 mm) which had been injection-molded under the conditions of a molding temperature of 200° C. and a mold temperature of 40° C. and the surface of which had been mirror-finished, and the distance from the gate to the point was measured and evaluated according to the following criteria.

"○": distance from the gate is 15 cm or more
"Δ": distance from the gate is 14 cm to less than 15 cm
"x": distance from the gate is less than 14 cm

[Mirror Surface Gloss]

The mirror surface gloss (%) at light source irradiation angles of 60° and 20° was measured using a gloss meter (manufactured by Nippon Denshoku Industries Co., Ltd., NDH-300) on a molded square plate (length 350 mm, width 100 mm, thickness 2 mm) which had been injection-molded under the conditions of a molding temperature of 200° C. and a mold temperature of 40° C. and the surface of which had been mirror-finished.

Evaluation of Examples A1 to A3 and Comparative Examples A1 to A7

Examples A1 to A3 are examples in which the MFR of the whole composition was within the range of 37 g/10 min or more and less than 50 g/10 min. Further, Examples A1 is an example (as the second invention) in which MFR of the propylene-based polymer (P1) contained in the composition was within the range of more than 80 g/10 min and 100 g/10 min or less. Examples A2 and A3 are examples (as the first invention) in which MFR of the propylene-based polymer (P1) contained in the composition was within the range of more than 100 g/10 min and 130 g/10 min or less.

Specifically, in Example A1, 44 parts by mass of a propylene/ethylene block copolymer (P1-1) having an MFR of 95 g/10 min was used as the component (P1). In Example A2, 23 parts by mass of a propylene/ethylene block copolymer (P1-1) having an MFR of 95 g/10 min and 23 parts by mass of a propylene/ethylene block copolymer (P1-2) having an MFR of 110 g/10 min were used in combination as

TABLE 1

|  |  |  |  | Example A1 | Example A2 | Example A3 |
|---|---|---|---|---|---|---|
| Blending composition | Component (P1) | P1-1 |  | 44 | 23 |  |
|  |  | P1-2 |  |  | 23 | 46 |
|  | Component (P2) | P2-1 |  | 11 | 11 | 11 |
|  | Component (E1) | E1-2 |  | 17.5 | 16 | 16 |
|  | Component (E2) | E2-1 |  | 7 | 7 | 7 |
|  | Component (F) | Talc |  | 20.5 | 20 | 20 |
| Property of composition | MFR (230° C., 2.16 kg) | g/10 min |  | 42 | 45 | 47 |
| Physical property of molded article | Flexural modulus | MPa |  | 2132 | 2137 | 2102 |
|  | IZOD impact strength | kJ/m² |  | 4.6 | 4.4 | 4.5 |
|  | −30° C. puncture impact strength | J |  | 33.2 | 41.6 | 45 |
| Appearance property | Flow mark | — |  | ○ | ○ | ○ |
|  | Mirror surface gloss | 60° | % | 26.6 | 25.7 | 31.8 |
|  |  | 20° | % | 6.8 | 6.4 | 9.9 |

TABLE 2

|  |  |  |  | Comparative Example A1 | Comparative Example A2 | Comparative Example A3 | Comparative Example A4 | Comparative Example A5 | Comparative Example A6 | Comparative Example A7 |
|---|---|---|---|---|---|---|---|---|---|---|
| Blending composition | Component (P1) | P1-1 |  | 47 | 47 |  |  |  | 51 | 46 |
|  |  | P1-2 |  |  |  | 47 | 47 | 56 | 8 |  |
|  | Component (P2) | P2-1 |  | 11 | 11 | 11 | 11 |  |  | 11 |
|  | Component (E1) | E1-1 |  |  |  |  | 7 |  |  |  |
|  |  | E1-2 |  |  | 15 | 19 | 15 |  |  | 16 |
|  |  | E1-3 |  | 15 |  |  |  | 10 |  |  |
|  |  | E1-4 |  |  |  |  |  |  | 17.5 |  |
|  |  | E1-5 |  |  |  |  |  |  | 5 |  |
|  |  | E1-6 |  |  |  |  |  | 10 |  |  |
|  | Component (E2) | E2-1 |  | 7 | 7 | 3 |  |  |  | 7 |
|  | Component (F) | Talc |  | 20 | 20 | 20 | 20 | 20 | 19 | 20 |
|  | Other | HDPE |  |  |  |  |  | 4 |  |  |
| Property of composition | MFR (230° C., 2.16 kg) | g/10 min |  | 45 | 38 | 41 | 45 | 34 | 43 | 39 |
| Physical property of molded article | Flexural modulus | MPa |  | 2223 | 2179 | 2119 | 2171 | 1915 | 2011 | 2179 |
|  | IZOD impact strength | kJ/m² |  | 3.8 | 3.5 | 4.8 | 4.5 | 5.2 | 4.3 | 4 |
|  | −30° C. puncture impact strength | J |  |  |  |  |  |  |  | 26.9 |
| Appearance property | Flow mark | — |  | ○ | ○ | x | Δ | x | x | ○ |
|  | Mirror surface gloss | 60° | % | 31.5 | 21.3 | 55.7 | 62.7 | 49.8 | 57.5 | 19.7 |
|  |  | 20° | % | 7.3 | 5.1 | 22 | 32.1 | 23.1 | 31.2 | 3.9 | the component (P1) (MFR of the whole component (P1) was about 102 g/10 min). In Example A3, 46 parts by mass of a propylene/ethylene block copolymer (P1-2) having an MFR of 110 g/10 min was used as the component (P1).

As shown in Table 1, the compositions of Examples A1 to A3 were excellent in any of the evaluation items.

On the other hand, the compositions of Comparative Examples A1 and A2 in which the amount of the component (E1) was small were inferior particularly in the IZOD impact strength as compared with Examples A1 to A3, as shown in Table 2. The composition of Comparative Example A3 having a small amount of the component (E2) had particularly high mirror surface gloss as compared with Examples A1 to A3, and additionally, a flow mark was generated near the gate. The compositions of Comparative Examples A4 to A6 containing no component (E2) also had particularly high mirror surface gloss as compared with Examples A1 to A3, and additionally, a flow mark was generated near the gate.

The composition of Comparative Example A7 in which the MFR of the component (P1) contained in the composition was low and the amount of the component (P1) was large was inferior in the impact strength (particularly, −30° C. puncture impact strength) as compared with Examples A1 to A3.

Examples B1 to B5 and Comparative Examples B1 to B3

Each of the resin compositions composed of components in blending amounts (parts by mass) shown in Tables 3 and 4 was prepared, respectively, and the MFR of each of the resin compositions was measured by the method described above. The flexural modulus, the IZOD impact strength, the flow mark and the mirror surface gloss were evaluated by the methods described above. The results are shown in Tables 3 and 4.

TABLE 3

| | | | | Example B1 | Example B2 | Example B3 | Example B4 | Example B5 |
|---|---|---|---|---|---|---|---|---|
| Blending composition | Component (P1) | P1-1 | | 28 | 54 | | 57 | |
| | | P1-2 | | 29 | | 57 | | 53 |
| | Component (E1) | E1-2 | | 16 | 18 | 16 | 19 | 16 |
| | Component (E2) | E2-1 | | 7 | 7 | 7 | 4 | 10 |
| | Component (F) | Talc | | 20 | 21 | 20 | 20 | 21 |
| Property of composition | MFR (230° C., 2.16 kg) | | g/10 min | 33 | 28 | 34 | 35 | 27 |
| Physical property of molded article | Flexural modulus | | MPa | 2110 | 1945 | 2072 | 2115 | 1924 |
| | IZOD impact strength | | kJ/m$^2$ | 5.8 | 6.6 | 6.3 | 4.5 | 18.3 |
| Appearance property | Flow mark | | — | ○ | ○ | ○ | ○ | ○ |
| | Mirror surface gloss | 60° | % | 30.2 | 41.2 | 42.0 | 39.8 | 46.6 |
| | | 20° | % | 7.6 | 9.9 | 15.1 | 9.7 | 14.6 |

TABLE 4

| | | | | Comparative Example B1 | Comparative Example B2 | Comparative Example B3 |
|---|---|---|---|---|---|---|
| Blending composition | Component (P1) | P1-1 | | 28 | 28 | 28 |
| | | P1-2 | | 29 | 29 | 29 |
| | Component (E1) | E1-1 | | | 7 | |
| | | E1-2 | | 20 | 16 | 16 |
| | Component (E2) | E2-1 | | 3 | | |
| | Component (F) | Talc | | 20 | 20 | 20 |
| | Other | HDPE | | | | 7 |
| Property of composition | MFR (230° C., 2.16 kg) | | g/10 min | 35 | 35 | 36 |
| Physical property of molded article | Flexural modulus | | MPa | 2034 | 2078 | 2168 |
| | IZOD impact strength | | kJ/m$^2$ | 6.6 | 6.1 | 4.4 |
| Appearance property | Flow mark | | — | x | x | Δ |
| | Mirror surface gloss | 60° | % | 44.8 | 42.5 | 40.3 |
| | | 20° | % | 14.0 | 12.9 | 12.4 |

Evaluation of Examples B1 to B5 and Comparative Examples B1 to B3

Examples B1 to B5 are examples (as the third invention) in which the MFR of the whole composition was within the range of less than 37 g/10 min. As shown in Table 3, the compositions of Examples B1 to B5 were excellent in any of the evaluation items.

On the other hand, in the case of the composition of Comparative Example B1 in which the amount of the component (E2) was small, a flow mark was generated particularly near the gate, as shown in Table 4. Also in the case of the compositions of Comparative Examples B2 and B3 which did not contain the component (E2), a flow mark was generated particularly near the gate.

Examples C1 to C5 and Comparative Examples C1 to C3

Each of the resin compositions composed of components in blending amounts (parts by mass) shown in Tables 5 and 6 was prepared, respectively, and the MFR of each of the resin compositions was measured by the method described above. The flexural modulus, the IZOD impact strength, the flow mark and the mirror surface gloss were evaluated by the methods described above. The results are shown in Tables 5 and 6.

Evaluation of Examples C1 to C5 and Comparative Examples C1 to C3

Examples C1 to C5 are examples (fourth invention) in which the MFR of the whole composition was 50 g/10 min or more. As shown in Table 5, the compositions of Examples C1 to C5 were excellent in any of the evaluation items.

On the other hand, in the case of the composition of Comparative Example C1 in which the amount of the component (E2) was small, a flow mark was generated particularly near the gate, as shown in Table 6. Also in the case of the compositions of Comparative Examples C2 and C3 which did not contain the component (E2), a flow mark was generated particularly near the gate.

INDUSTRIAL APPLICABILITY

The propylene-based resin composition according to the present invention is useful as a molding material for automobile exterior members (for example, bumpers, side moldings, back doors, fenders, back panels), and can be suitably used particularly for unpainted bumper materials.

The invention claimed is:
1. A propylene-based resin composition comprising
    40 to 60 parts by mass of a propylene-based polymer (P1) having a melt flow rate (230° C., under a load of 2.16 kg) of more than 100 g/10 min and 130 g/10 min or less

TABLE 5

|  |  |  | Example C1 | Example C2 | Example C3 | Example C4 | Example C5 |
|---|---|---|---|---|---|---|---|
| Blending composition | Component (P1) | P1-1 |  | 22 | 44 |  |  |
|  |  | P1-2 | 46 | 23 |  | 43 | 44 |
|  | Component (P2) | P2-1 | 14 | 15 | 16 | 15 | 14 |
|  | Component (E1) | E1-2 | 16 | 16 | 16 | 16 | 18 |
|  | Component (E2) | E2-1 | 4 | 4 | 4 | 6 | 4 |
|  | Component (F) | Talc | 20 | 20 | 20 | 20 | 20 |
| Property of composition | MFR (230° C., 2.16 kg) | g/10 min | 57 | 56 | 56 | 50 | 53 |
| Physical property of molded article | Flexural modulus | MPa | 2421 | 2434 | 2477 | 2284 | 2306 |
|  | IZOD impact strength | kJ/m$^2$ | 4.0 | 3.6 | 3.5 | 4.2 | 4.4 |
| Appearance property | Flow mark | — | ○ | ○ | ○ | ○ | ○ |
|  | Mirror surface gloss | 60° % | 34.4 | 26.2 | 22.7 | 36.5 | 51.6 |
|  |  | 20° % | 12.2 | 6.2 | 5.6 | 11.5 | 18.2 |

TABLE 6

|  |  |  | Comparative Example C1 | Comparative Example C2 | Comparative Example C3 |
|---|---|---|---|---|---|
| Blending composition | Component (P1) | P1-2 | 46 | 46 | 46 |
|  | Component (P2) | P2-1 | 14 | 14 | 13 |
|  | Component (E1) | E1-1 |  | 4 |  |
|  |  | E1-2 | 18 | 16 | 16 |
|  | Component (E2) | E2-1 | 2 |  |  |
|  | Component (F) | Talc | 20 | 20 | 20 |
|  | Other | HDPE |  |  | 5 |
| Property of composition | MFR (230° C., 2.16 kg) | g/10 min | 60 | 59 | 59 |
| Physical property of molded article | Flexural modulus | MPa | 2409 | 2385 | 2324 |
|  | IZOD impact strength | kJ/m$^2$ | 3.8 | 4.0 | 3.7 |
| Appearance property | Flow mark | — | Δ | Δ | Δ |
|  | Mirror surface gloss | 60° % | 48.1 | 44.3 | 49.0 |
|  |  | 20° % | 19.6 | 19.8 | 19.5 | and having an amount of a n-decane-soluble part at 23° C. of 5 to 25% by mass, wherein the ethylene content of the n-decane-soluble part is more than 40% by mass and 60% by mass or less, 5 to 20 parts by mass of a propylene homopolymer (P2), more than 15 parts by mass and 40 parts by mass or less of an ethylene/α-olefin copolymer (E1), 4 to 20 parts by mass of an ethylene/α-olefin/diene copolymer (E2), and 0 part by mass or more and less than 36 parts by mass of an inorganic filler (F)

[providing that the total amount of the components (P1), (P2), (E1), (E2) and (F) is taken as 100 parts by mass].

2. A propylene-based resin composition comprising 20 to 45 parts by mass of a propylene-based polymer (P1) having a melt flow rate (230° C., under a load of 2.16 kg) of more than 80 g/10 min and 100 g/10 min or less and having an amount of a n-decane-soluble part at 23° C. of 5 to 25% by mass, wherein the ethylene content of the n-decane-soluble part is more than 40% by mass and 60% by mass or less, 5 to 20 parts by mass of a propylene homopolymer (P2), more than 15 parts by mass and 40 parts by mass or less of an ethylene/α-olefin copolymer (E1), 4 to 20 parts by mass of an ethylene/α-olefin/diene copolymer (E2), and 0 part by mass or more and less than 56 parts by mass of an inorganic filler (F)

[providing that the total amount of the components (P1), (P2), (E1), (E2) and (F) is taken as 100 parts by mass].

3. The propylene-based resin composition according to claim 1, wherein the melt flow rate (230° C., under a load of 2.16 kg) is 37 g/10 min or more and less than 50 g/10 min.

4. A propylene-based resin composition comprising 20 to 60 parts by mass of a propylene-based polymer (P1) having an amount of a n-decane-soluble part at 23° C. of 5 to 25% by mass, wherein the ethylene content of the n-decane-soluble part is more than 40% by mass and 60% by mass or less, 0 to 20 parts by mass of a propylene homopolymer (P2), more than 15 parts by mass and 40 parts by mass or less of an ethylene/α-olefin copolymer (E1), 4 to 20 parts by mass of an ethylene/α-olefin/diene copolymer (E2), and 0 part by mass or more and less than 61 parts by mass of an inorganic filler (F)

[providing that the total amount of the components (P1), (P2), (E1), (E2) and (F) is taken as 100 parts by mass], wherein the propylene-based resin composition has a melt flow rate (230° C., under a load of 2.16 kg) of less than 37 g/10 min.

5. A propylene-based resin composition comprising 20 to 60 parts by mass of a propylene-based polymer (P1) having an amount of a n-decane-soluble part at 23° C. of 5 to 25% by mass, wherein the ethylene content of the n-decane-soluble part is more than 40% by mass and 60% by mass or less, 5 to 20 parts by mass of a propylene homopolymer (P2), more than 15 parts by mass and 40 parts by mass or less of an ethylene/α-olefin copolymer (E1), 4 to 20 parts by mass of an ethylene/α-olefin/diene copolymer (E2), and 0 part by mass or more and less than 56 parts by mass of an inorganic filler (F)

[providing that the total amount of the components (P1), (P2), (E1), (E2) and (F) is taken as 100 parts by mass], wherein the propylene-based resin composition has a melt flow rate (230° C., under a load of 2.16 kg) of 50 g/10 min or more.

6. The propylene-based resin composition according to claim 4, wherein 40 to 60 parts by mass of a propylene-based polymer having a melt flow rate (230° C., under a load of 2.16 kg) of more than 100 g/10 min and 130 g/10 min or less is contained as the propylene-based polymer (P1), and 0 part by mass or more and less than 36 parts by mass of the inorganic filler (F) is contained.

7. The propylene-based resin composition according to claim 4, wherein 20 to 45 parts by mass of a propylene-based polymer having a melt flow rate (230° C., under a load of 2.16 kg) of more than 80 g/10 min and 100 g/10 min or less is contained as the propylene-based polymer (P1).

8. The propylene-based resin composition according to claim 1, wherein the ethylene/α-olefin copolymer (E1) has a melt flow rate (230° C., under a load of 2.16 kg) of 1 to 5 g/10 min and the ethylene/α-olefin/diene copolymer (E2) has a melt flow rate (230° C., under a load of 2.16 kg) of more than 0.1 g/10 min and 0.5 g/10 min or less.

9. The propylene-based resin composition according to claim 1, wherein the propylene-based polymer (P1) is a propylene/ethylene block copolymer.

10. A molded article obtained by molding the propylene-based resin composition as described in claim 1.

11. The molded article according to claim 10, which is an automobile exterior member.

12. The molded article according to claim 11, which is an unpainted bumper material.

* * * * *